(12) United States Patent
Pfeiffer et al.

(10) Patent No.: US 8,043,542 B2
(45) Date of Patent: Oct. 25, 2011

(54) METHOD FOR THE PRODUCTION OF FIBER-REINFORCED POLYPROPYLENE MOLDED PARTS CONTAINING PORES

(75) Inventors: Eberhard Pfeiffer, Kandel (DE); Harri Dittmar, Battenberg (DE); Karl-Ludwig Brentrup, Moriken (CH)

(73) Assignee: Quadrant Plastic Composites, AG, Lenzburg (CH)

( * ) Notice: Subject to any disclaimer, the term of this patent is extended or adjusted under 35 U.S.C. 154(b) by 176 days.

(21) Appl. No.: 12/527,598

(22) PCT Filed: Feb. 19, 2008

(86) PCT No.: PCT/CH2008/000068
§ 371 (c)(1),
(2), (4) Date: Aug. 18, 2009

(87) PCT Pub. No.: WO2008/101360
PCT Pub. Date: Aug. 28, 2008

(65) Prior Publication Data
US 2010/0032870 A1 Feb. 11, 2010

(30) Foreign Application Priority Data
Feb. 19, 2007 (CH) .................................. 0278/07

(51) Int. Cl.
*B29C 43/18* (2006.01)
*B29C 43/20* (2006.01)

(52) U.S. Cl. ........ 264/248; 264/249; 264/257; 264/275; 264/258; 264/325

(58) Field of Classification Search .................. None
See application file for complete search history.

(56) References Cited

U.S. PATENT DOCUMENTS

| 3,353,236 | A | * | 11/1967 | Stedman | 425/104 |
| 5,111,579 | A | * | 5/1992 | Andersen | 29/897.32 |
| 6,297,176 | B1 | * | 10/2001 | North et al. | 442/120 |

FOREIGN PATENT DOCUMENTS

| EP | 0255314 A2 | 2/1988 |
| EP | 0255315 A2 | 2/1988 |
| EP | 0743632 A2 | 11/1996 |
| EP | 1736298 A1 | 12/2006 |
| WO | 2006105682 A1 | 10/2006 |
| WO | 2006133586 A1 | 12/2006 |

* cited by examiner

*Primary Examiner* — Edmund H. Lee
(74) *Attorney, Agent, or Firm* — Brooks Kushman P.C.

(57) ABSTRACT

Low density and acoustically absorbing panels are produced by consolidation in a mold of a heated part of a pre-cut, lofty, semi-finished product containing polypropylene fibers and reinforcing fibers and having an air pore content of 20 to 80 vol.-% wherein overlapping with the periphery of the pre-cut part are heated strips of polypropylene optionally containing up to 60 wt.-% reinforcing fibers, but containing 5 vol.-% or less of air pores.

12 Claims, 2 Drawing Sheets

Figure 1A:
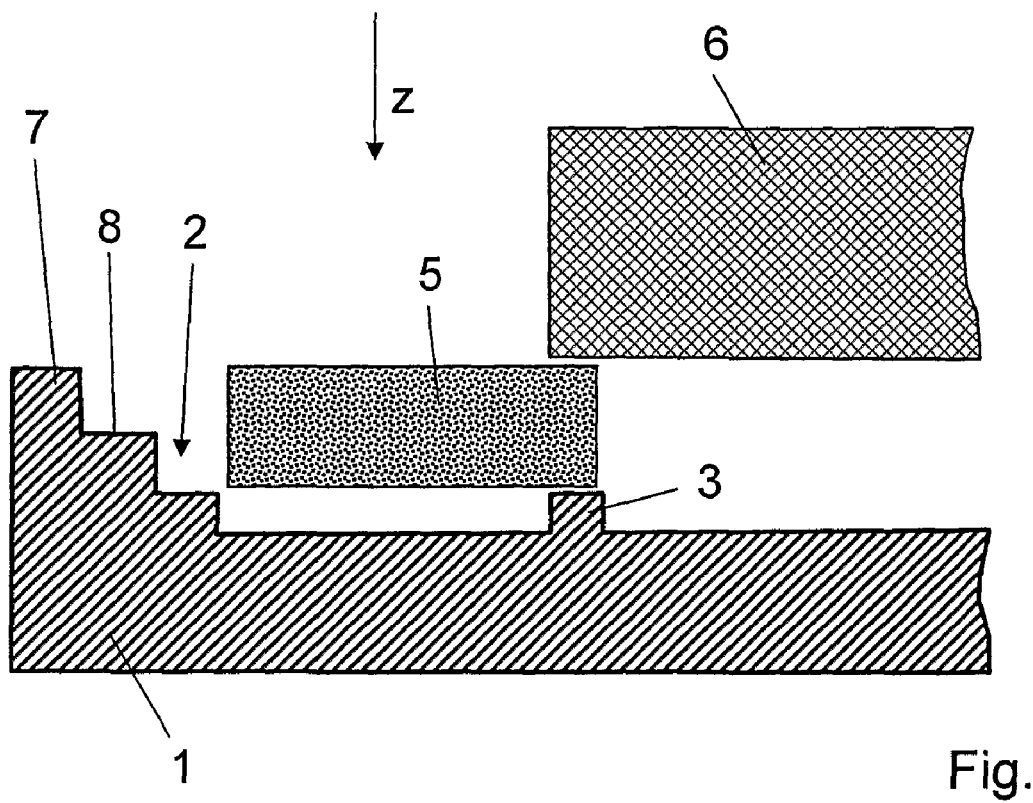

METHOD FOR THE PRODUCTION OF FIBER-REINFORCED POLYPROPYLENE MOLDED PARTS CONTAINING PORES

CROSS-REFERENCE TO RELATED APPLICATIONS

This application is the U.S. national phase of PCT Appln. No. PCT/CH2008/000068 filed Feb. 19, 2008 which claims priority to Switzerland application CH 278/07 filed Feb. 19, 2007.

BACKGROUND OF THE INVENTION

1. Field of the Invention

The invention relates to a method for the production of light-weight molded parts made of fiber-reinforced polypropylene, wherein a pre-cut part A of a flat semifinished product made of fiber-reinforced polypropylene with a content of reinforcing fibers of 35 to 80 wt-% and a content of uniformly distributed air pores of 20 to 80 vol-% is placed into a two-part mold, heat pressed and thereby molded.

2. Description of the Related Art

Thermoplastically moldable panels of semifinished product made of glass fiber-reinforced polypropylene, so called GMT panels, have already been used for a long time for the production of moldings, in particular for automotive parts. Such "plastic panels", which generally have a thickness of 0.5 to 3 mm, stand out for their high strength and toughness. Moreover, GMT is capable of flowing, so that it completely fills up the inner contours of the tool during heat pressing of the semifinished product into finished parts. GMT semifinished product is manufactured on a large scale industrially by combining continuous glass mats and polypropylene melt sheets on a double band press. This procedure consumes a large amount of energy because the viscous melt must be pressed into the mat at pressures far above 1 bar. It is thus hardly possible, in practice, to achieve a fiber content greater than 45 wt %.

In order to overcome these drawbacks, semifinished product panels have recently been developed that are also made of glass fiber-reinforced polypropylene but contain air pores with a uniform distribution, so that the finished parts thus produced are lighter and have better noise absorption than finished parts made of GMT semifinished product. Moreover, the production of such air semifinished products containing air pores requires considerably smaller amounts of energy. In practice, they are manufactured by two methods:

In a dry process, e.g. according to WO 2006/105682, polypropylene fibers and glass fibers are blended together, the resulting blended nonwoven is needled, heated to temperatures above the softening point of the polypropylene and compressed on a double band press at pressures below 1 bar.

In a wet process, chopped glass fiber bundles and polypropylene particles are dispersed in an aqueous solution of an emulsifier, whereupon the dispersion is pressed out, dried and heat pressed. The panel thus obtained is thermally expanded to a porous semifinished product.

Such semifinished products containing air pores are generally not capable of flowing, so that a pressforming process has to be used for the production of finished parts. For the production of components having dimensions differing from the form of a rectangle by means of pressing in two-part forming tools it is necessary to either punch out appropriate blanks from the semifinished panels or to do some machining of the parts after pressing, which can also result in substantial amounts of punching waste. In this process, a second, costly operation step is necessary. Moreover, functional parts, e.g. fixation parts that cannot be made with the pressforming process, have to be attached by means of an additional welding step.

SUMMARY OF THE INVENTION

Therefore, an object of this invention is to overcome these disadvantages. These and other objects are achieved by the present invention, according to which a preferably rectangular pre-cut part A of a flat semifinished product comprising fiber-reinforced polypropylene with a content of reinforcing fibers of 35 to 80 wt-% and a content of uniformly distributed air pores of 20 to 80 vol-% is heated to a temperature above the softening point of polypropylene, placed into a two-part mold, pressed and thereby molded, with one or several polypropylene strips B having a content of reinforcing fibers of 0 to 60 wt.-% and a content of air pores of less than 5 vol.-% that were heated to a temperature above the softening point of the polypropylene being pressed together with the pre-cut part overlapping the boundary thereof.

According to DE-A 2005 029 729, for producing molded parts, a porous blended fiber nonwoven, e.g. made of glass fibers and polypropylene fibers, is pressed in a two-part tool in such a manner that the porosity is essentially retained in the interior of the nonwoven whereas at the border, and to some extent also in that region of the interior where there is only a small distance between female cavity and male tool, highly compressed regions are formed.

Air pores containing semifinished products are well known and are commercially available as strips or boards with a width of preferably 300 to 2300 mm, e.g. SYMALITE of Quadrant Plastic Composites AG, SEEBERLITE of Röchling Automotive AG, ACOUSTIMAX of Owens Corning Corp., SUPERLITE of Azdel Inc. and KARAMTEC of Karam Tech Co.

These semifinished products generally have a thickness of 0.5 to 10 mm, preferably 1 to 5 mm, before expansion. They consist of fiber-reinforced polypropylene with a melt index MFI (230° C., 2.16 kp) of 12 to 200, preferably of 15 to 75 g/10 min and contain 35 to 80, preferably 40 to 70 wt-.% reinforcing fibers that are preferably needled. The reinforcing fibers are, in particular, glass fibers, but can also be plastic, basalt, polyester or other high-strength synthetic fibers. Natural fibers are also useful, e.g. fibers of jute, flax, hemp, sisal, kenaf or cotton. The fibers generally have an average length (weight average) of 10 to 100, preferably of 20 to 50 mm. Before expansion the semifinished product has an air pore content of 20 to 80, preferably of 35 to 70 vol.-%. Upon heating to temperatures above the softening point of polypropylene, the semifinished product expands to more than double, preferably more than three to ten times its original thickness due to the restoring force of the fibers.

In the process for the production of molded parts according to the present invention, a precut part A of the above described semifinished product is placed into a two-part mold. For this purpose, a preferably rectangular pre-cut part A, e.g. having a length of 1000 to 2000 mm and a width of 300 to 1000 mm and having ap-proximately the dimensions of the molded part, is first cut out of a strip or a panel of the semifinished product and placed into the mold. According to the invention, one or several polypropylene strips B with a content of reinforcing fibers of 0 to 60 wt.-% and a content of air pores of less than 5 vol.-%, preferably of less then 1 vol.-%, which have also been heated to a temperature above the softening point of the polypropylene, are then pressed together with the pre-cut part over-lapping the boundary thereof. In this step, at least 30%, preferably at least 60% and in particular 100% of the boundary of the pre-cut part A is overlapped by the strips B, and the overlap is 5 to 50 mm on average.

The strips B are, in particular, a flat GMT semi-finished product consisting of fiber-reinforced polypropylene with a melt index MFI (230° C., 2.16 kg) of 20 to 500, particularly 80 to 200 g/10 min, and containing 20 to 60 wt-.% needled, nondirectional reinforcing fibers, preferably glass fibers, with an average length (weight average) of 5 to 50, particularly 10 to 40 mm, and preferably containing no air pores at all. The strips B generally have a thickness of 0.5 to 8 mm, preferably of 1 to 5 mm, and a width of 20 to 100, preferably of 50 to 80 mm. They can be cut off from commercially available GMT panels. Before pressing, they are placed into the mold so as to overlap either above or preferably underneath the boundary of the pre-cut part. Upon heating above the softening point of polypropylene, the GMT semifinished product also expands.

For strip B, it is also possible to use an LFT semifinished product. LFT semifinished product consists of polypropylene with a melt index MFI (230° C., 2.16 kp) of 20 to 500, preferably of 80 to 200 g/10 min and of 20 to 60 wt-.% non-needled glass fibers with an average length (weight average) of 2 to 30 mm. It is produced by blending polypropylene and continuous glass fibers or chopped glass fibers in a twin shaft extruder wherein the glass fibers are trimmed to the desired length depending on the shear action of the extruder worms. Depending on the cross section of the nozzle, the blend is pressed out of the extruder either as a melt strand or as a melt sheet. The pressed out strand or sheet is laid out on a conveyor belt, cut to the desired length and, if necessary, heated up again and placed into the mold so as to overlap either above or preferably underneath the boundary of the pre-cut part A.

In both cases, the pre-cut part A and the strips B are heated up outside of the mold to a temperature above the softening point of the polypropylene, preferably to 180 to 220° C., whereupon the pre-cut part as well as the strips expand. These are then placed into the mold consisting of a female cavity and a male tool. In the overlap region the mold preferably has a "clamping and sealing region" with the shape of a circumferential web which shall prevent the softened and flowable GMT or LFT material from being forced by its high pressure to flow into the zone with the air pores containing pre-cut part. Moreover, in the region of the strips the distance between the female cavity and the male tool is relatively small so that upon pressing a relatively high pressure, e.g. from 100 to 250 bar is built up, whereas the distance in the region of the pre-cut part is much larger, thus resulting in a pressure of only e.g. 2 to 5 bar.

Upon heating, the GMT or LFT material becomes a molten fluid due to the relatively high melt index of the polypropylenes, whereas the air pores containing pre-cut part only softens because there the polypropylene mostly has a smaller melt index and the applied pressure is much smaller in that area. Upon pressing, which generally takes 10 to 100, preferably 15 to 60 sec, the pre-cut part A thus is draped only onto the contours of the mold in z direction and maintains an air pore content of e.g. 10 to 80 vol.-%, whereas the strips B flow into the boundary regions of the mold and are completely pressed together due to the high pres-sure. In this way, lateral recesses in the female cavity can also be filled out, so that bulges, lateral projections and functional parts such as fastening clips, lugs, jackets and other inserts can be formed on the molded part.

Figure 1B:
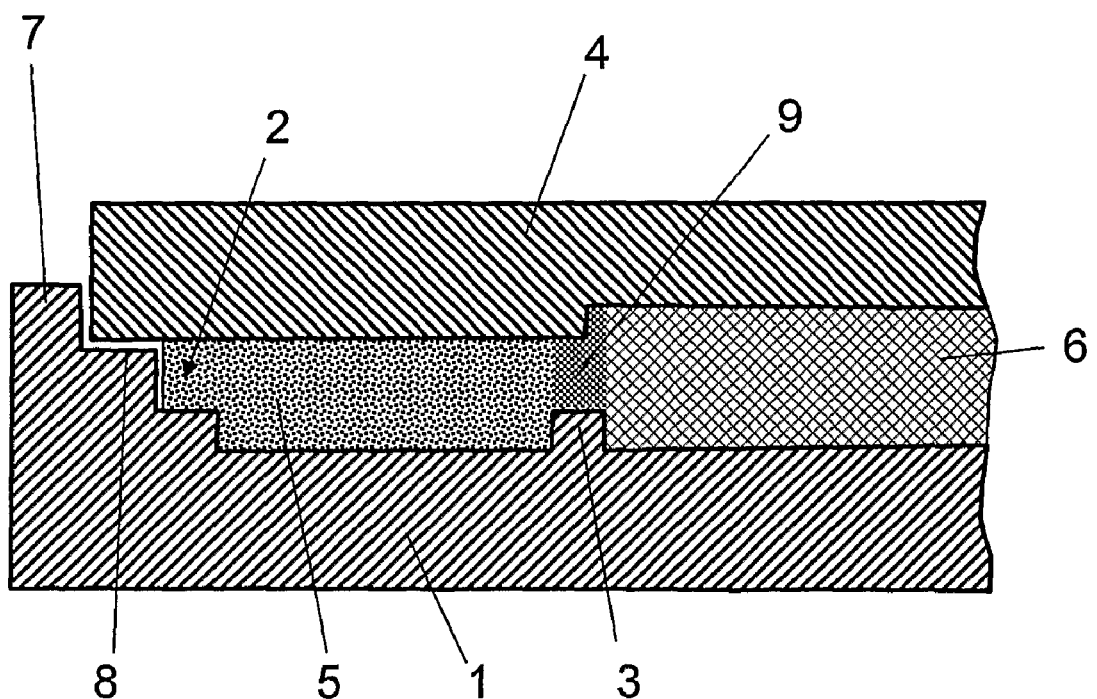

FIGS. 1a and 1b show schematically and not to scale a section through the mold, which consists of a female cavity 1 with recesses 2, web 3 and male tool 4 (only shown in FIG. 1b), as well as a pre-cut part 6 and a strip 5, once in an opened and once in a closed state. In the example shown, the female cavity is provided with a guide rim 7 that surrounds a supporting surface 8 for the male tool 4.

Figure 2:
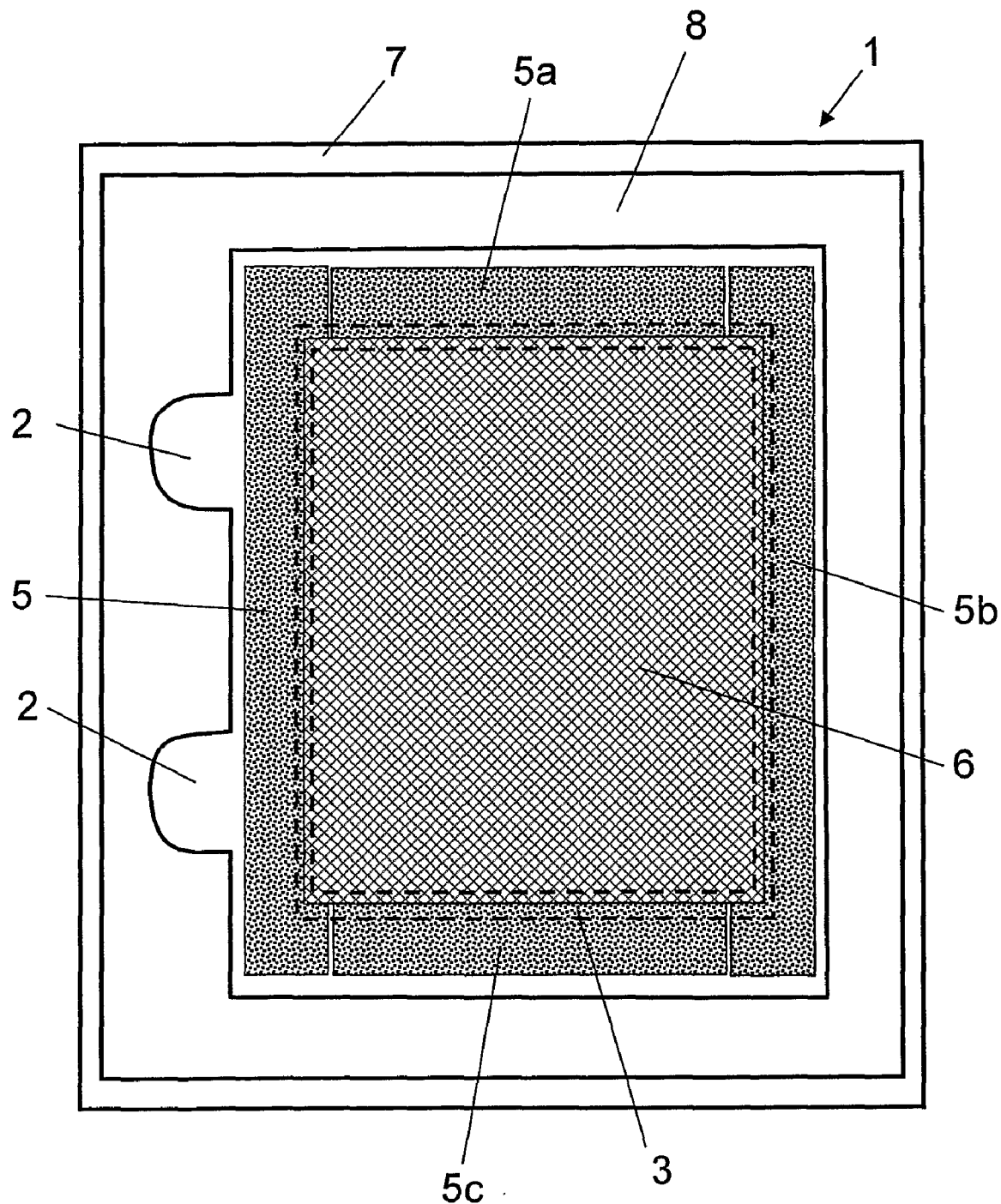

FIG. 2 shows a plan view onto the open mold, wherein the pre-cut part 6 and four strips 5, 5a, 5b, 5c rest overlappingly on the female cavity 1 with recesses 2 for bulges and lugs. Upon lowering the male tool 4 in z direction, the strips 5, 5a, 5b, 5c and the pre-cut part 6 are pressed together in an overlap region 9 in the neighborhood of web 3.

In a further embodiment of the invention, the strips B are produced by injection molding, whereby also more complex structures can be produced. This is achieved by using, for example, turnover plate tools as are usually employed in injection molding technology for the production of components made of two or more different polymers. In such a case, the shape can be other than rectangular.

In a first process step, the part of the component that consists of the pore containing composite material is produced with a rectangular pre-cut part. This first step corresponds to the usual processing in the pressforming method. In a second process step, the remaining part of the component is injection molded, whereby the external contours are formed and complex functional parts can be integrated. The regions to be filled by injection molding can be cleared after the pressing step by means of an appropriate slide mold in the tool, or a second tool-half is used after turning over the tool. To increase profitability, this technology can also be implemented with multiple cavities (more than one component per tool).

In this embodiment, the strips B may consist of polypropylene with a melt index MFI (230° C., 2.16 kg) of 20 to 400, preferably 80 to 200 g/10 min which can be blended with 0 to 60, preferably 20 to 50 wt.-%, related to the blend, of glass fibers with an average length (weight average) of 0.01 to 10 mm, preferably 0.1 to 3 mm.

Unreinforced polypropylene as well as polypropylene containing reinforcing fibers can be provided as pellets and fused, or the polymer and the fibers are blended directly on-site by means of commercially available compounders and subsequently fused, whereby profitability is further increased.

The molded parts produced according to the present invention stand out by their relatively small weight along with a high rigidity and tear propagation strength and by a good acoustic insulation as well as by the possibility of profitably manufacturing very large component parts. They can be used as exterior and interior parts in the automotive field, e.g. as headliner, underbody lining, luggage trunk covering and hat shelf, but also as wood substitute, e.g. in the building industry and in the furniture industry.

EXAMPLE

A pre-cut part of polypropylene with an MFI of 25 g/10 min containing glass fibers with an average length of 50 mm and an air pore content of 55 vol.-% and having the dimensions 350×1800×2.5 mm, and four strips of GMT semifinished product with a thickness of 3.8 mm and a width of 60 mm, of which two strips have a length of 1770 mm and two strips have a length of 60 mm, are each heated to 210° C. In this process, the GMT strips expand to a thickness of 8 mm and the pre-cut part expands to a thickness of 12 mm.

On a female cavity having outer dimensions 2000×500 mm and an internally circumferential web with a width of 8 mm the strips are laid out adjacent to the inner edge and resting on the web. The pre-cut part is then placed thereon in such manner that the strips and the pre-cut part overlap each other by 10 mm (see FIG. 1a).

The mold is closed by applying the male tool, the distance between the male tool and the female cavity being 4 mm in the region of the pre-cut part and 1.5 mm in the region of the strips. Finally, pressure is applied for 45 sec on the mold having a low temperature of about 40° C. The GMT strips are thus pressed to a thickness of 1.5 mm and the pre-cut part to a thickness of 4 mm, whereby they are joined together in the overlapping region (see FIG. 1b). The finished product has an air pore content of 65 vol-% in its middle region.

The invention claimed is:

1. A method for the production of molded parts made of fiber-reinforced poly-propylene, wherein a pre-cut part A with a length of 1000 to 2000 mm and a width of 300 to 1000 mm of a flat semi-finished product made of fiber-reinforced polypropylene with a content of reinforcing fibers of 35 to 80 wt.-% and a content of uniformly distributed air pores of 20 to 80 vol.-% is heated to a temperature above the softening point of the polypropylene, placed into a two-part mold, pressed and thereby molded, wherein prior to molding one or several strips B with a width of 20 to 100 mm made of polypropylene with a content of reinforcing fibers of 0 to 60 wt.-% and a content of air pores of less than 5 vol.-% which were heated to a temperature above the softening point of the polypropylene are placed in the mold, the strips overlapping the pre-cut part A with an overlap region of 5 to 50 mm on average, and are pressed together with the part A, where a pressure of 100 to 250 bar is built-up where the pre-cut part A and the strips B overlap, whereby the strips B flow into a boundary region of the mold adjoining the pre-cut part A.

2. The method of claim 1, wherein at least 30% of the boundary of the pre-cut A is overlapped by the strips B.

3. The method of claim 1, wherein at least 60% of the boundary of the pre-cut A is overlapped by the strips B.

4. The method of claim 1, wherein at least about 100% of the boundary of the pre-cut A is overlapped by the strips B.

5. The method of claim 1, wherein the semifinished product of the pre-cut part A consists of fiber-reinforced polypropylene with a melt index MFI (230° C., 2.16 kg) of 12 to 200 g/10 min and 40 to 70 wt.-% glass fibers with an average length of 10 to 100 mm and having a thickness of 0.5 to 10 mm.

6. The method of claim 1, wherein the strips B consist of a flat GMT semi-finished product made of fiber-reinforced polypropylene with a melt index MFI (230° C., 2.16 kg) of 20 to 500 g/10 min and 20 to 60 wt.-% of irregularly distributed, needled glass fibers with an average length of 5 to 50 mm and having a thickness of 0.5 to 5 mm, which are laid out so as to overlap either above, underneath or both above and underneath the pre-cut A part before pressing.

7. The method of claim 1, wherein the strips B consist of LFT semifinished product made of fiber-reinforced polypropylene with a melt index MFI (230° C., 2.16 kg) of 20 to 500 g/10 min, and 20 to 60 wt.-% non-needled glass fibers with an average length of 2 to 30 mm, which are laid out as an extruded strand or as a melt sheet so as to overlap either above, underneath, or both above and underneath the pre-cut part A before pressing.

8. The method of claim 6, wherein a rectangular pre-cut part A with a thickness of 0.5 to 10 mm and the strips B are heated up outside of the mold to a temperature above the softening point of the polypropylene, whereupon the pre-cut part and the strips expand to more than double their original thickness, the pre-cut part and the strips are then placed into the mold and pressed for 15 to 60 sec, the pre-cut part A still maintaining an air pore content of 10 to 80 vol.-%, but the strips B flowing into the boundary regions of the mold and following pressing being pressed together completely.

9. The method of claim 7, wherein a rectangular pre-cut part A with a thickness of 0.5 to 10 mm and the strips B are heated up outside of the mold to a temperature above the softening point of the polypropylene, whereupon the pre-cut part and the strips expand to more than double their original thickness, the pre-cut part and the strips are then placed into the mold and pressed for 15 to 60 sec, the pre-cut part A still maintaining an air pore content of 10 to 80 vol.-%, but the strips B flowing into the boundary regions of the mold and following pressing being pressed together completely.

10. The method of claim 1, wherein the strips B comprise polypropylene with a melt index MFI (230° C., 2.16 kg) of 20 to 400 g/10 min and 0 to 60 wt.-% glass fibers with an average length of 0.01 to 10 mm, which are injected as a melt into a closed mold in the boundary region of the pre-cut part in which the pre-cut part A has already been placed.

11. The method of claim 1, wherein the polypropylene of the pre-cut part A softens, and the polypropylene of the strips melt and become a molten fluid.

12. The method of claim 1, wherein the polypropylene of the pre-cut part A has a lower melt index than a melt index of the polypropylene of the strips B.

* * * * *